(12) United States Patent
Bartelt (10) Patent No.: US 10,450,711 B2
(45) Date of Patent: Oct. 22, 2019

(54) METHOD FOR ARTIFICIALLY ERODING DAMMED BODIES OF WATER

(71) Applicant: Dietrich Bartelt, Duisburg (DE)

(72) Inventor: Dietrich Bartelt, Duisburg (DE)

( * ) Notice: Subject to any disclaimer, the term of this patent is extended or adjusted under 35 U.S.C. 154(b) by 0 days.

(21) Appl. No.: 15/514,246

(22) PCT Filed: Sep. 18, 2015

(86) PCT No.: PCT/EP2015/071493
§ 371 (c)(1),
(2) Date: Jul. 17, 2017

(87) PCT Pub. No.: WO2016/046090
PCT Pub. Date: Mar. 31, 2016

(65) Prior Publication Data
US 2017/0314219 A1     Nov. 2, 2017

(30) Foreign Application Priority Data
Sep. 25, 2014    (DE) .................. 10 2014 014 009

(51) Int. Cl.
*E02B 3/02*     (2006.01)
*E02B 8/08*     (2006.01)
*F03B 13/10*    (2006.01)

(52) U.S. Cl.
CPC ............. *E02B 3/02* (2013.01); *E02B 3/023* (2013.01); *E02B 8/085* (2013.01); *F03B 13/10* (2013.01); *Y02A 40/60* (2018.01)

(58) Field of Classification Search
CPC combination set(s) only.
See application file for complete search history.

(56) References Cited

U.S. PATENT DOCUMENTS 1,573,785 A  *  2/1926  Albright ................ E02B 8/085
                                                        405/78
3,817,153 A  *  6/1974  Zunzer .................. F15B 1/027
                                                        60/405

FOREIGN PATENT DOCUMENTS

| DE | 2937612    | * | 4/1981  |
|----|------------|---|---------|
| JP | 3636998    | * | 6/2001  |
| JP | 2008261091 | * | 10/2008 |
| JP | 2012188829 | * | 3/2011  |
| JP | 6138029    | * | 11/2013 |

* cited by examiner

*Primary Examiner* — Sean D Andrish
(74) *Attorney, Agent, or Firm* — Dinsmore & Shohl LLP (57) ABSTRACT

A method is provided for the artificial erosion of dammed bodies of water, wherein an average grain size distribution of sediments in the dammed body of water is determined across the ground surface of the dammed body of water. A sediment requirement for downstream water is determined, and as a result, at least one displacement of the sediments in the dammed body of water into the downstream water takes place in accordance with the sediment requirements for the downstream water. Advantageously, requirements regarding at least the quantity and grain size of the sediment for the downstream water are determined.

19 Claims, 4 Drawing Sheets

METHOD FOR ARTIFICIALLY ERODING DAMMED BODIES OF WATER

CROSS-REFERENCE TO RELATED APPLICATIONS

This application is the U.S. national stage of PCT/EP2015/071493 filed on Sep. 18, 2015 which claims priority of German Patent Application 10 2014 014 009.1 filed Sep. 25, 2014.

FIELD OF THE INVENTION

The present specification relates to a method for artificially eroding dammed bodies of water, such as artificial lakes, reservoirs or dammed natural lakes, and other significantly modified bodies of water.

BACKGROUND OF THE INVENTION

Fluvial sediments transported by rivers, such as dissolved mineral content and floating or suspended mineral content and rubble or sediment are of ecological significance for rivers. In particular, the sediment is transported out of the river in salts or rubble. Furthermore, there is suspended sediment in the river, which floats substantially free in the water columns. In undeveloped rivers, sedimentation processes, i.e. the depositing of the sediment transported in the fluvial, and erosion processes, i.e. the removal of sediments, is normally at an equilibrium. If a body of water is dammed, the flow cross section of the river changes over broad ranges. As a result of these cross section changes, the current speed slows down, wherein the sediment is deposited and is no longer transported. Consequently, increasing amounts of sediment are deposited in dammed bodies of water. The same applies for reservoirs, e.g. from hydropower plants, where the water remains relatively calm between individual operating procedures, i.e. pumping and turbine operations. On one hand, the increasing sediment on the ground in dammed bodies of water reduces the capacity of the dammed body of water, and on the other hand, the fluvial sediment is missing in the downstream water, i.e. the water located downstream of the dam.

The fluvial sediment is needed in rivers in order to counterbalance sedimentation processes at other locations. This affects flood protection in particular, because rivers free of sediment transport water more quickly, such that flood waves progress more quickly, and also have greater amplitudes. There is frequently stronger erosion at the bases of a dam or a retaining wall, which may compromise the stability of the dam making it unsafe. In addition to water, solids, living organisms, gases, e.g. carbon dioxide, oxygen, methane and other gases resulting from decomposition, and energy, in particular in the form of flow speeds and temperature, are transported in rivers. If the transport is prevented through blockages, or strongly compromised, there are also ecological consequences downstream of the dam. There are frequently fewer nutrients contained in water when suspended matter has deposited in dammed bodies of water. Furthermore, the retention of solid matter, such as rocks, sand and gravel, can increase the flow speed in the downstream water. The energy that would otherwise be applied for transporting fluvial sediment is then consumed entirely by the flow speed of the water. The flow speed increased in this manner has a greater erosion effect on the riverbed, resulting in further increase in the flow speed, and channels being cut into the riverbed.

A further disadvantage with dammed bodies of water is that already at a sediment depth of approximately 2 cm of the deposited sediments, decomposition processes of organic matter can only take place anaerobically. This leads to an increased discharge of methane. Taking into consideration the large number of barrages present in individual, navigable dammed bodies of water, including those used for generating energy from hydropower, the output of methane from dammed bodies of water is immense.

Methods are known from the prior art, which provide a transportation of sediment deposits in dammed bodies of water. Thus, EP 2 134 902 B1 describes a method for transporting sediments in hydropower plants, wherein the sediment deposit is collected in the sediment region of the reservoir, and the accumulated sediment deposits are transported to the erosion region of the reservoir in the vicinity of the discharge organ.

The object of the present specification is to improve the known prior art.

SUMMARY OF THE INVENTION

A method for the artificial erosion of dammed bodies of water is proposed, wherein an average grain size distribution of sediments in the dammed body of water is determined across the ground surface of the dammed body of water. A sediment requirement for downstream water is determined, and as a result, at least one displacement of the sediments in the dammed body of water into the downstream water takes place in accordance with the sediment requirements for the downstream water. Advantageously, requirements regarding at least the quantity and grain size of the sediment for the downstream water are determined.

The artificial erosion advantageously takes place through a mechanical accumulation of the sediments. It is advantageous with the proposed method that it is possible, through the determination of the sediment requirements for the downstream water, and the introduction of the corresponding sediment from the dammed body of water into the downstream water, to reproduce ecologically optimal sediment conditions in the downstream water.

Another advantage with the method described herein is that, in order to determine occurrences or times, e.g. for flood protection, there can be an increased sediment entry into the downstream water, in order to reduce the flow energy in a downstream section, and thus to regulate or control amplitudes and/or flow speeds.

The river(s) or bodies of water opening into the dammed bodies of water carry a large quantity of sediment into the dammed body of water, with a wide range of grain sizes. The running water is decelerated as it approaches the dam, such that sediment that has been transported is deposited incrementally. As a result, a sediment distribution in dammed bodies of water can be observed, wherein rubble and gravel are deposited first, and thus collect as sand at a greater distance from the dam, and sediments are normally only present in the form of silt and clay in the vicinity of the dam itself.

As a result, there is a distribution of the average grain sizes of the sediment in the dammed body of water of fine sediment having an average grain size of less than approximately 0.2 mm, preferably fine sand having an average grain size of less than approximately 0.2 mm, and silt and clay having an average grain size of less than 0.063 mm, medium sized sand and large sized sand having an average grain size of approximately 0.2 mm, and others, up to gravel, having an average grain size of more than approximately 2 mm, in particular up to approximately 63 mm. Furthermore, fine particles having an average grain size of less than 0.01 mm also belong to fine sediment. These include nanoparticles in particular and/or deposits of nanoparticles, in particular having an average grain size of 1 nm to 300 nm, or 1 nm to 100 nm, respectively.

Larger rubble and rocks are also forms of sediments, wherein these are already deposited quite early, and no longer moved when the running water enters the dammed body of water. The determination of the grain size distribution can take place mathematically or by estimation, in particular with the aid of the measured or calculated flow speed. In another design, it is provided that the determination of the distribution of the average grain sizes of the sediment in dammed bodies of water is obtained through taking samples or sightings.

When flow speed is mentioned in the framework of this present specification, this is to be understood to mean the actually measured or calculated flow speed. In particular, the flow speed can be determined on the basis of calculated or measured water levels, calculated or measured precipitation, calculated or measured air temperature, calculated or measured air pressure, calculated or measured humidity, calculated or measured wind speed, calculated or measured evaporation, or calculated or measured other data, as well as any combination thereof.

In order to determine the sediment, a finger sample is preferably taken according to German Standard DIN 19682-2 for sands, loam, silts, and clays and/or a dry sieving takes place according German Standard DIN 66165-2 for sands, gravel and rubble.

According to one design of the method, it is provided that a removal of the sediment in the dammed body of water takes place, having an approximate average grain size corresponding to the sediment requirements for the downstream water. This means that the removal and/or accumulation takes place in particular there, where sediments are to be expected or are known of through measurements, having appropriate grain sizes or grain size distributions, such as those required in downstream water. If larger distributions of the grain sizes are required in the downstream water, it is then provided in one design that the removal and/or accumulation takes place in numerous regions of the dammed body of water. Different regions of the dammed body of water are further advantageously approached, in which different average grain sizes are expected, in order to cover the sediment requirements in the downstream water. In particular, it is provided that sediments having different average grain sizes are transported to the downstream water incrementally, and potentially continuously, in order to cover the average sediment requirements for the downstream water over a longer period of time. The longer time period is approximately one day to approximately one year, in particular, further preferably approximately one day to approximately one week, more preferably approximately one week to approximately one month, more preferably approximately one month to approximately one year.

A sediment requirement for the downstream water is understood in particular to be a selective sediment requirement. This can be determined at an arbitrary point in the downstream water, e.g. in the framework of a limnological monitoring. This comprises, by way of example, a finger sample taken according German Standard DIN 19682-2 and/or a dry sieving taking place according to German Standard DIN 66165-2. It is particularly preferred that a location is selected for the determination where there are flow conditions and flow speeds that are typical for the downstream water. Such a location is generally at a distance to the dam. Furthermore, a sediment requirement for the downstream water is also understood in particular to be an averaged or interpolated sediment requirement. This can be based, e.g. on parameters or samples selectively determined at numerous locations in the downstream water.

A particularly important parameter is the flow speed. If it is particularly strong in the downstream water, then there will also be no larger grain sizes in the downstream water. With low flow speeds, sediments having larger diameters are also still present in the downstream water. In this case, there is an increased lack of sediments having smaller and medium grain sizes. Because the flow speed and other parameters of the downstream water are substantially decoupled from those of the dammed body of water, it is not necessarily the case that the dammed or "excess" sediments in dammed bodies of water are also lacking in these quantities in downstream water. It is also not the case that sediments of all sizes are absolutely necessary. For this reason, the method according to the present specification also comprises a determination of a sediment requirement of the downstream water that is separate from the determination of a distribution of the average grain sizes of sediment in the dammed body of water.

It is particularly preferably provided that the downstream water and/or the dammed body of water and/or at least one body of water flowing into the dammed body of water are limnologically monitored. The limnological monitoring includes lakes as well as flowing bodies of water from the source to where they flow into a river or a sea or an ocean, or to the river delta, respectively. It is further preferred that the limnological monitoring includes a hydrological monitoring, a bathymetric monitoring, a monitoring of the benthos, and/or an ecological monitoring. In particular, the flow speed, the turbidity, nutrients in water, erosion and/or sedimentation of specific characterizing regions, solids transported in moving water, gases dissolved in water, the water level, the temperature of the water at characterizing locations, as well as living creatures and/or further limnologically relevant data, are monitored. Furthermore, according to one design, it is provided that a hydrological monitoring of at least a portion of the water, i.e. the downstream water, the dammed body of water, and/or at least one body of water flowing into the dammed body of water, is carried out. In another embodiment, a hydrometric monitoring is provided. Furthermore, a valve setting of an outlet, or the actual and/or planned outflow quantity from the dam, in particular through a submerged drain, a flood protection drain, a drinking water removal drain and/or a turbine drain, can be determined in the monitoring, and preferably be included in the calculation of the sediment requirement. The determined limnological data and other potential data, e.g. weather, are used according to one design, in order to determine the sediment requirements for the downstream water. The determination of the limnological data for the dammed body of water is used in particular to monitor the dammed body of water regarding ecological and/or drinking water aspects thereof. By way of example, the artificial erosion can be stopped or temporarily interrupted if there is an excessive methane level in the dammed body of water due to the removal and/or accumulation of the sediment in the dammed body of water.

It is particularly preferably provided that the sediment requirement for the downstream water is determined by means of measurement data from the limnological monitoring.

It is furthermore advantageously provided in one embodiment, that the displacement of sediments is controlled via a control circuit. The displacement of sediments, in particular that in the removal location in dammed bodies of water or in the introduction location in downstream water, as well as the removal speed and other properties relevant to the removal and/or accumulation, are regulated by the measurement data obtained from a monitoring of the downstream water and optionally, the dammed body of water.

It is provided in another design that the displacement of the sediments is controlled. By way of example, the displacement of the sediments is controlled depending on opening states of a bypass passage, a flood control passage, an underwater discharge opening, and/or a turbine or drinking water removal opening. With the knowledge of which contribution into the downstream water takes place at which opening in the dam, the sediment requirement can be estimated, or calculated, respectively, and the appropriate quantity and the appropriate grain size distribution of the sediments can be introduced into the downstream water.

In another design of the method, it is provided that the removal and/or accumulation takes place by means of at least a dredger, by means of a flushing method and/or an injection method. In particular, it is provided in one design that at least one suction dredger, e.g. a hopper dredger or cutter dredger is used. In another design, it is provided that air or water is injected into the sediments, in order to release, in particular, suspended particles, or fine sediments in a grain size of <0.2 mm, and to remove them by means of a suction device, or to allow them to be transported off by the current in the dammed body of water.

In particular in the case where large sediment deposits already exist in dammed bodies of water, it may be necessary to provide interim depots for at least temporary storage of excess sediment. Thus, it is provided in one design that sediments of the dammed body of water are accumulated and stored in at least one interim depot. The interim depot(s) can be designed as large tanks or naturally occurring pools, into which the sediment is at least temporarily deposited. The temporarily stored sediment is preferably also, or in and of itself, conveyed to the downstream water at a later point in time. In another design it is provided that excess sediment, which is not to be introduced into the downstream water, is brought to dredging spoil disposal sites.

In another design it is provided that the sediments are classified prior to storage in the interim depot. In particular, the sediment is classified according to grain size, preferably average grain size, in particular by means of sieves. In another design, a classification according to point of removal in the dammed body of water, or a hydraulic classification is carried out. The classification prior to storage in the interim depot simplifies the selection of the average grain size from the interim depot when a displacement of the sediments in the interim depot into the downstream water takes place according to the sediment requirements of the downstream water, as is provided in another design.

In another design it is provided that the sediments are introduced in front of, into, or behind a drain in the dammed body of water. In particular, it is provided that the introduction is made in the proximity of a turbine drain, a basic drain, a bypass, or some other drain in the dammed body of water. The phrase "in the proximity of" with regard to the discharge organ of the dammed body of water in question does not comprise, as set forth in the present specification, the direct introduction of sediment deposits into the discharge organs or a depositing of the accumulated sediments directly in front of, i.e. without a spacing to, the discharge organ. Instead, the phrase "in the proximity of" is to be understood to mean that the sediments are brought into the proximity of the discharge organ, depending on its size.

In this manner, a transport of the sediment deposit to a maximum approximately 1 m in front of the discharge organ of a relevant dammed space is advantageous. It is further preferred that the transport of the sediments takes place in a range of at least approximately 1.5 m, further preferred at least approximately 2 m, and more further preferred at least approximately 3 m in front of the discharge organ of the relevant dammed body of water. With large bodies of water, the distance is preferably at least approximately 8 m, and preferably lies in a range of approximately 1 m to approximately 300 m, preferably approximately 1 m to 100 m, more preferably in a range of approximately 1 m to approximately 50 m. In another design it is provided that the sediment is introduced directly in front of the discharge organ, or introduced into the discharge organ. This depends on the relevant dammed body of water and its function and its suitability for this. In another advantageous design it is provided that the sediment is introduced directly into the downstream water. It is particularly preferred that it is provided that the sediment is introduced into the region of the water flowing into the downstream water, i.e. the sediment is introduced into the downstream water, or brought into the proximity thereof, by flowing over or around a dam or introduced directly into the water flowing out of the dammed body of water into the downstream water, or directly into the downstream water. It is furthermore preferably provided that the sediment is introduced into erosion regions, i.e. in regions subject to erosion, of the downstream water. Some dams currently exhibit erosion damage in the region of their foundations, which can be successfully rectified or mitigated by this method.

In one embodiment, in which the sediments are introduced into regions of the downstream water endangered by erosion or damaged by erosion, it is provided by way of example, that the introduction of the sediments and the grain size distribution correspond basically to the observed erosion of the corresponding region.

When the terms "observation" or "measurement" or "determination" are used as set forth in the present specification, an electronic monitoring or an optoelectronic monitoring or an optoelectronic measurement or a sensor monitoring is provided in particular.

In another variation of the method, it is provided that the introduction location is varied. Thus, the sediment can be transported between an introduction in front of or into the dam, or behind the dam, to various introduction points, or successively. In another design it is provided that two or more sediment removal locations and sediment introduction locations are provided, which can be approached simultaneously. Thus, it is provided according to one design, that two, three, or more suction dredgers, or dredgers are provided, or flushing or injection procedures combined with one or more dredgers are provided, for transporting the sediments.

In another variation of the method it is provided that the displacement of the sediment of the dammed body of water into the downstream water takes place by means of a conveyor system. In particular, water of the dammed body of water and/or substances contained therein and/or living creatures can be displaced as well thereby as conveyed media, including, in particular, the aforementioned gases as well. It is particularly preferred that a conveyor system is used that comprises at least one spiral conveyor. This preferably comprises at least one auger and a spiral pump hutch.

Advantageously, the conveyor system can also be used to obtain electrical energy. For this, the conveyor system can comprise a generator. The water pressure or gravity can be used, for example, to drive the conveyor system and the generator. In particular with a conveyor system comprising a spiral conveyor, the operating principle of the Archimedean screw can be reversed for obtaining power. Furthermore, the power can be used directly for the method described above, e.g. to operate sensors that are used. As a result, the method according to the present specification is energy-efficient, or can be operated on its own power. The conveyor system preferably comprises a battery and/or power lines.

The conveyor system preferably comprises a transmission and/or a motor or a transmission motor, respectively, for controlling or limiting the conveyance speed and direction. In particular, it is also possible to implement a conveyance direction from the downstream water to the dammed body of water.

The conveyor system is preferably designed such that the conveyance medium is not compromised and/or only subjected to low shearing forces. As a result, it is prevented that the grain sizes of the displaced sediments are unintentionally reduced. Furthermore, it can be ensured that potential living creatures present in the conveyance medium, such as fish, do not become injured. By way of example, a conveyor system can be used that comprises at least one eccentric spiral pump.

Furthermore, the conveyor system can be used as a water ladder. Fish and other living creatures can travel by means thereof from the downstream water to the dammed body of water, or vice versa. As a result, it is again advantageously possible to pass through the flowing water, in particular for migrating fish.

The conveyor system can comprise numerous spiral conveyors and/or eccentric spiral pumps in order to implement a displacement of the conveyance medium, in particular sediments, over greater heights and/or slopes.

Furthermore, the conveyor system can comprise a suction, pressure, flushing and/or injection device for displacing the conveyance medium, or the sediments. The conveyor system can comprise, in particular, a pump unit. This can be designed as a suction pump and/or a pressure pump. The pump unit can furthermore be designed as a jet pump. Moreover, the pump unit can be designed as a hydraulic ram.

The conveyor system can comprise a monitoring device. This can be used for limnological monitoring. The monitoring device can be a mobile monitoring device. It can comprise at least one transport device, e.g. an automobile, a buoy, a boat, a submarine, a ship, a balloon, a dirigible, a rocket, a satellite, a drone, an airplane, a spacecraft, and/or a satellite. The transport device is preferably unmanned. Alternatively, or additionally, the monitoring device can be at least partially stationary. This can comprise a radio tower, for example.

The conveyor system or the monitoring system, respectively, can comprise a computer, in particular at least one computer-supported artificial neural network, virtual network and/or virtual machine. The control circuit for controlling the displacement of the sediment can be a part of the neural network, a virtual machine and/or a virtual network. Furthermore, the monitoring device can be connectable to a social network, in order to enable data exchange, data processing and/or a system control.

The monitoring device can comprise at least one measurement device for determining measurement data for the limnological monitoring. The transfer of measurement data and/or control signals can be wireless, e.g. by radio transmission.

The measurement device can comprise at least one sensor and/or actuator. The sensor can be an optical sensor, acoustic sensor and/or a sensor for chemical analysis. The sensor can furthermore be, in particular, a capacitive and/or inductive sensor. This can preferably comprise two electrical conductor paths, disposed adjacent and/or parallel to one another, in order to detect changes in an electrical field between the conductor paths.

The measurement device can comprise a bridge circuit having resistance strain gauges. The measurement device can furthermore comprise a piezo element. This can be a ceramic multi-layered component having precious metal interior electrodes. Furthermore, it can comprise piezo actuators.

Furthermore, the conveyor system can comprise at least one conveyance line. At least a portion of the conveyance line can exhibit a constriction, in particular a conical constriction, in order to produce or equalize a pressure difference. This constriction can be less than 10% of the diameter of the rest of the conveyance line. Furthermore, the conveyance system can comprise a float, e.g. a pontoon.

Further advantageous designs can be derived from the following drawings. The developments depicted therein are not to be interpreted as limiting, however. Instead, the features described therein can be combined with one another and with the features described above to obtain further designs. Moreover, it should be noted that the reference symbols given in the description of the Figures do not limit the scope of protection for the present specification, but refer merely to the exemplary embodiment illustrated in the Figures. Identical components or components having the same function have the same reference symbols in the following. Therein:

DETAILED DESCRIPTION OF THE PREFERRED EMBODIMENTS

Figures 1A, 1B:
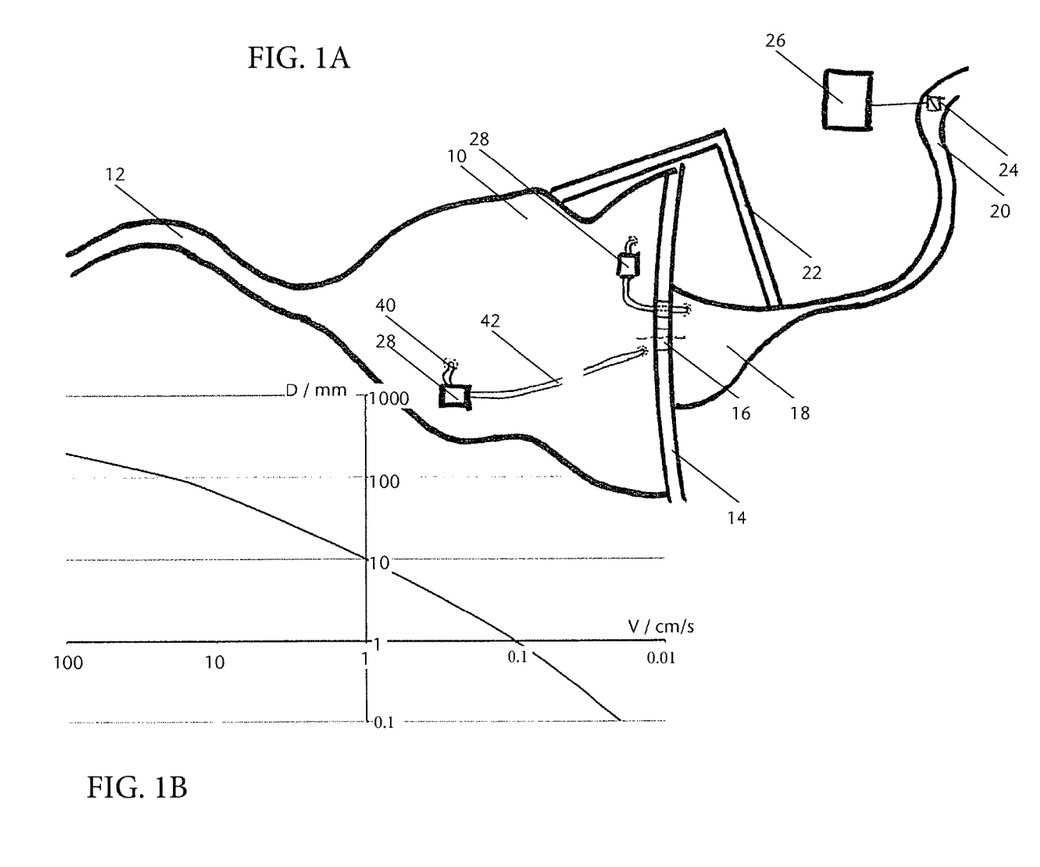
FIG. 1A shows a drawing of a dammed body of water.
FIG. 1B shows a dropout speed diagram in a schematic illustration.

FIG. 1 shows a dammed body of water 10, supplied by a river 12. The river 12 is blocked by a dam 14. A discharge organ 16, which discharges excess water, or used water, e.g. for a power plant, from the dammed body of water 10 into a downstream water 18, is used in particular to regulate the water level in the dammed body of water 10. The damming is preferably obtained such that the downstream water 18 opens into a river 20. Further measures for regulating the level of the dammed body of water 10 or for flood control can take place, for example, by means of a submerged drain 22.

By damming the river 12, there is a reduction in the flow speed in the region of the dam 14. This reduction in the flow speed is indicated schematically by the sediment deposit diagram beneath the river or the dammed body of water 10. The diagram shows the flow speed of the river 12 or the dammed body of water 10 toward the dam 14 on the x-axis, in a logarithmic distribution. The y-axis, which is likewise divided logarithmically, shows the grain size of the particles, which are deposited at the respective speed. It can be seen that with smaller grain diameters, sediment is transported further toward the dam 14. Larger sediments, i.e. sediments with a larger grain diameter, are deposited further away from the dam 14 than finer grains. In particular clay particles having a size of <2 μm are carried up to the dam, but with larger sediment grains, the flow speed is insufficient for this.

Known methods so far for displacing sediments in dammed bodies of water provide merely that sediments are accumulated from the ground of the dammed body of water according to certain patterns, or in a random manner, and these are then conveyed to the proximity of the discharge organ 16. It has been shown, however, that although this method is sufficient for pumped-storage power plants, it is accompanied by disadvantages for flowing bodies of water, or dammed flowing bodies of water, because the lacking, or incorrect composition of the sediments in downstream water can lead to erosion damage, flooding and other consequences. For this reason, the downstream water 18, or the water discharged herefrom, hereinafter referred to as discharge, is limnologically monitored. The monitoring is obtained by means of at least one sensor 24, which measures, e.g., flow speed, turbidity, nutrients, solids, gases, water level, temperature or other factors of the downstream water 18. Preferably, numerous of the specified factors are recorded and evaluated. A computer-supported monitoring unit 26, in particular, is available for this. The monitoring unit 26 activates at least one or more dredgers 28, depending on the measured values of the at least one sensor 24. These are preferably activated such that the monitoring unit 26 transmits a requirement for quantities of sediment and/or grain sizes to the dredgers 28, which then approach the sediment grain sizes corresponding to the previously determined and/or known sediment deposits in the dammed body of water, in order to then accumulate them in the downstream water 18, after which a redistribution takes place. The sediment can, as shown here by way of example, be deposited in front of the discharge organ 16, such that it either flows through the discharge organ, or it can be introduced directly into the downstream water, over or around the dam.

Figure 2:
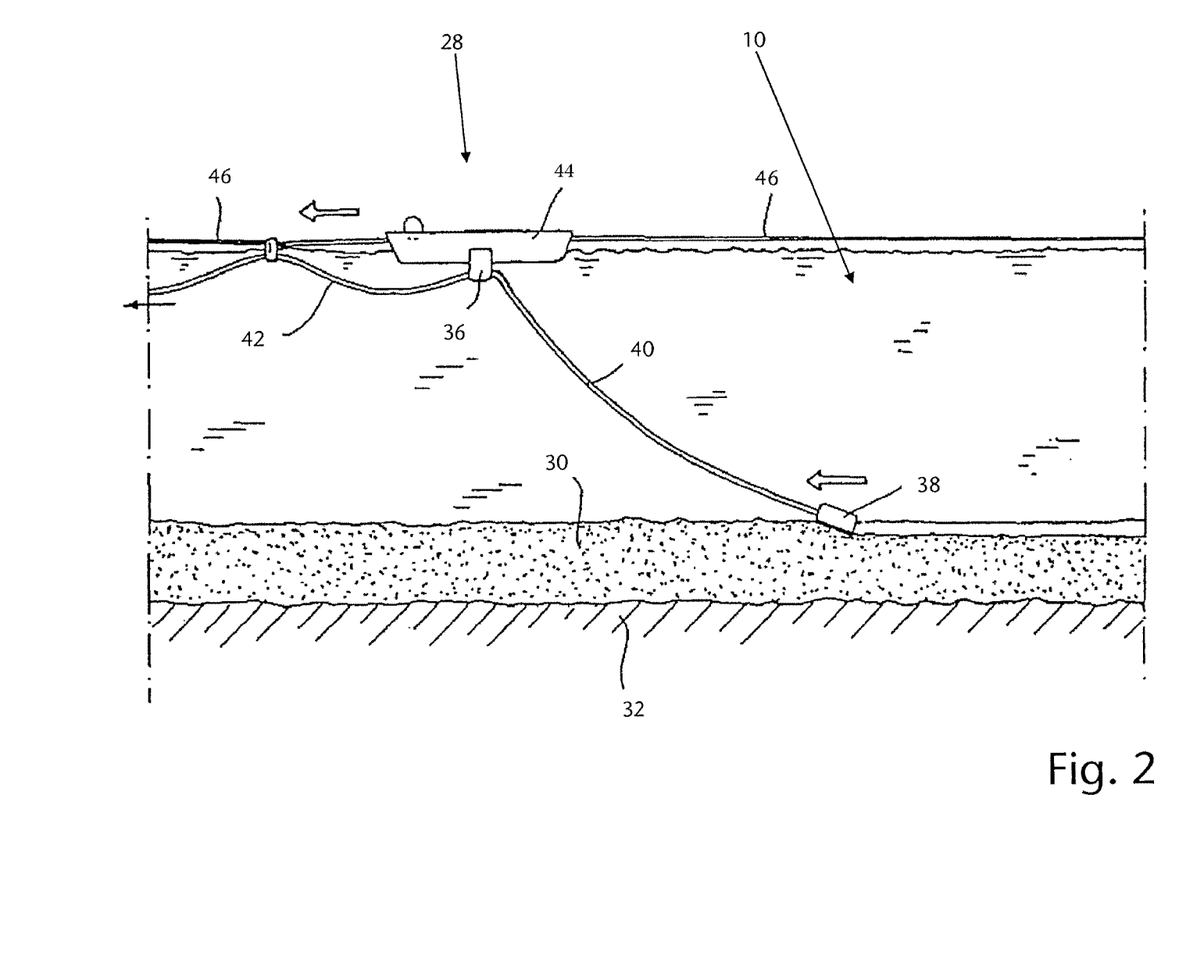
FIG. 2 shows a schematic illustration of a possible artificial erosion of the sediment deposit under water.

FIG. 2 shows, by way of example, the transport of the sediment deposits 30 from the floor 32 of the body of water 10 of the dammed body of water 10 by means of a suction dredger assembly 35. This is composed of a pump unit 36, a flushing head 38, and a conveyance line 40 and 42. A flushing head 38 is used to release the sediment deposits 30 from the floor 32 of the body of water 10, which comprises a milling machine for loosening the sediments 30. The released sediments 30 are accumulated and conveyed by means of the pump unit 36. The pump unit 36 also transports the sediment through the conveyance line 42 directly into the downstream water, or in a region of the dammed body of water 10 lying in the proximity of the discharge organ 16. Advantageously, the pump unit 36 is disposed on a pontoon 44. The pontoon 44 can be moved over a large area, preferably the entire area, of the dammed body of water by means of control ropes 46. In another design, not shown herein, it is provided that the suction dredger has its own drive unit, with which it can be moved over the dammed body of water 10.

Figure 3:
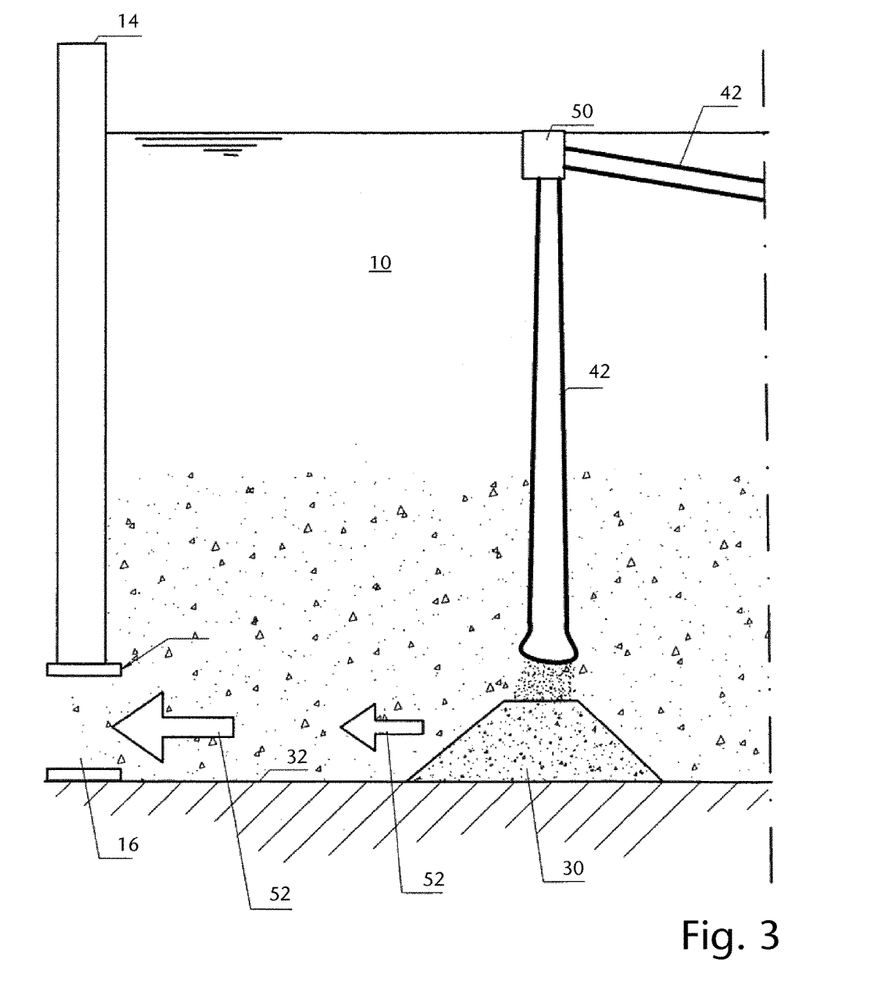
FIG. 3 shows a schematic illustration of a possible transport of sediment deposits in the proximity of a discharge organ under water.

FIG. 3 shows, by way of example, the depositing of the accumulated sediment 30 in the proximity of the discharge organ 16. The conveyance line 42 is held in place by means of floats 50, and can likewise be freely moved in one design, and in particular, it can be controlled. Preferably, by relocating the floats it is possible to impact different sediment grain sizes. In particular, larger grain sizes can be brought closer to the discharge organ 16, because the suction or flow speeds there can convey these without difficulty. Smaller sediment sizes require a greater distance to the discharge organ 16, because these can already flow through the discharge organ into the downstream water at lower flow speeds. The deposited sediment 30 is removed by the flowing water in the direction of the arrow 52, and conveyed into the downstream water. Additionally or alternatively, the removed sediment can also be transported directly into the downstream water, as already shown in FIG. 1, in particular at locations where strong erosions prevail, e.g. as a result of high flow speeds.

Figure 4:
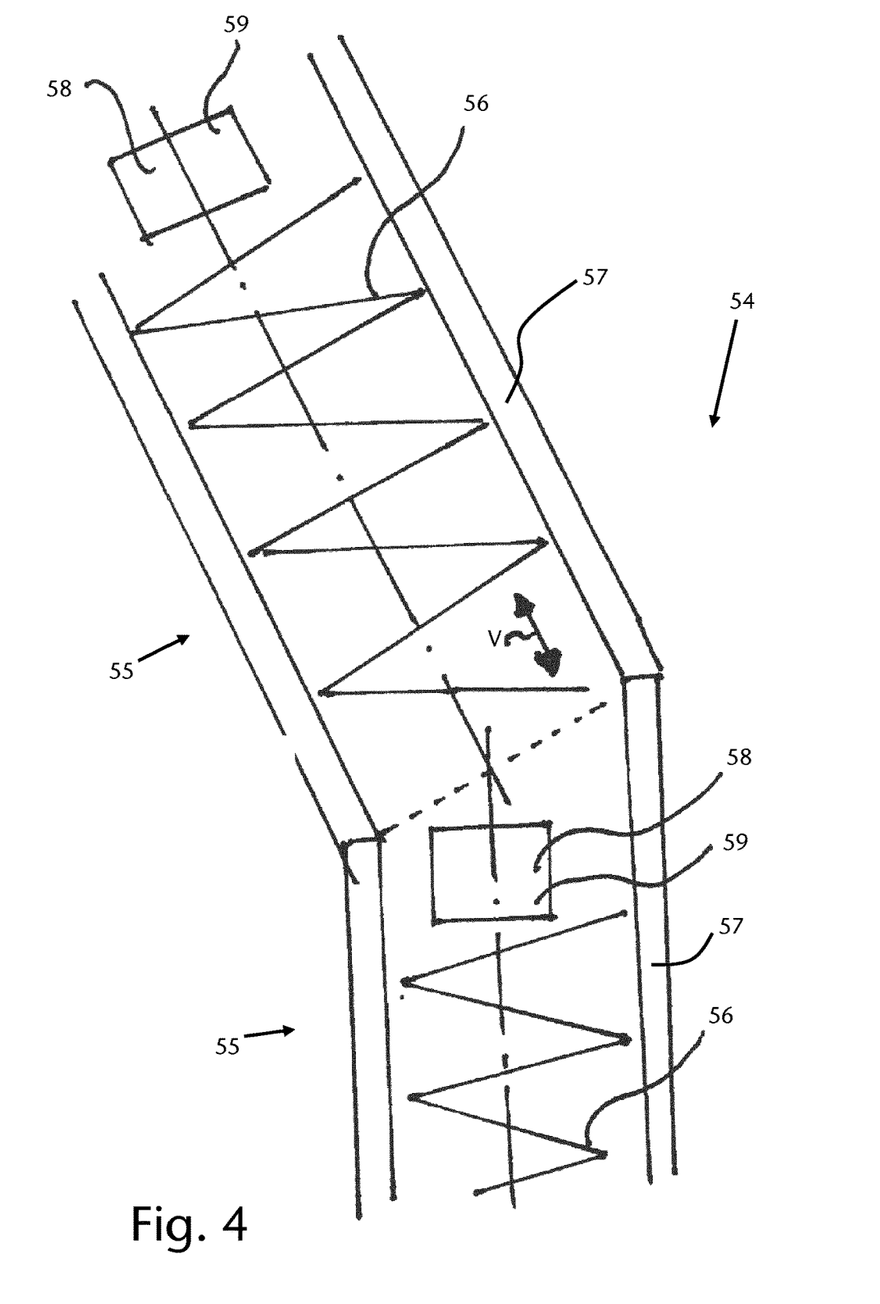
FIG. 4 shows a schematic cross sectional illustration of a section of a conveyor system for transporting sediment deposits.

FIG. 4 shows, by way of example, a conveyor system 54. This is designed as a connecting assembly between a dammed body of water 10 and a downstream water 18, and can be integrated, for example, in a dam 14. The conveyor system 54 has two spiral conveyors 55 disposed behind one another. These each comprise a conveyor auger 56, a spiral pump hutch 57, and a motor/generator unit 58, 59. The motor/generator unit 58, 59 comprises a motor 58 for driving the respective conveyor auger 56 and a generator for accumulating power. The conveyor system 54 has two directions of conveyance, or operating modes, respectively. In order to displace sediments 30 from dammed bodies of water 10 into downstream water 18, gravity or water pressure acts on the auger 56 such that it rotates, resulting in conveyance toward the downstream water 18. The rotation of the auger 56 can be used thereby by the generators 59 in order to obtain electrical energy.

Furthermore, the motors 58 of the augers 56 can be collectively driven in the opposite direction, in order to enable a direction of conveyance from the downstream water 18 into the dammed body of water 10. The conveyor system 54 can be used in this manner as a water ladder for living creatures.

The invention claimed is:

1. A method for artificially eroding a dammed body of water comprising the steps of:
   determining the distribution of average grain sizes of sediments in each of a plurality of regions over a ground surface of the dammed body of water;
   determining a sediment requirement for a selected region of a downstream water;
   identifying at least one region of the plurality of regions that has an average grain size corresponding to the determined sediment requirement of the selected region of downstream water; and
   distributing at least one displacement of the sediments from at least one region of the identified regions having an average grain size corresponding to the determining sediment into the downstream water.

2. The method according to claim 1, further comprising limnologically monitoring the downstream water.

3. The method according to claim 2, wherein the sediment requirements of the downstream water are determined by means of measurement data from the limnological monitoring.

4. The method according to claim 1, wherein the at least one displacement of the sediments is controlled via a control circuit.

5. The method according to claim 1, wherein the at least one displacement of the sediments is controlled.

6. The method according to claim 1, wherein the removal or accumulation takes place by means of at least one dredger, by means of a flushing procedure, or by means of an injection procedure.

7. The method according to claim 1, wherein the sediments of the dammed body of water are accumulated and stored in at least one interim depot.

8. The method according to claim 7, wherein the sediments are classified prior to storage in the at least one interim depot.

9. The method according to claim 1, wherein according to the sediment requirements of the downstream water a displacement of the sediments in the at least one interim depot into the downstream water takes place.

10. The method according to claim 1, wherein the sediments are introduced in front of, into or behind a drain for the dammed body of water.

11. The method according to claim 1, wherein the sediments are introduced directly into the downstream water.

12. The method according to claim 11, wherein the sediments are introduced into regions of the downstream water endangered by erosion, or damaged by erosion.

13. The method according to claim 1, wherein an introduction location is varied.

14. The method according to claim 1, wherein the at least one displacement of the sediments of the dammed body of water into the downstream water takes place by means of a conveyor system.

15. The method according to claim 14, wherein the conveyor system comprises at least one spiral conveyor.

16. The method according to claim 14, wherein the conveyor system is used for obtaining electrical energy.

17. The method according to claim 14, wherein the conveyor system is used as a water ladder.

18. The method according to claim 15, wherein the conveyor system is used for obtaining electrical energy.

19. The method according to claim 16, wherein the conveyor system is used as a water ladder.

* * * * *